United States Patent
Takazawa et al.

(10) Patent No.: US 10,800,328 B2
(45) Date of Patent: Oct. 13, 2020

(54) HEAD-UP DISPLAY AND PROGRAM

(71) Applicant: DENSO CORPORATION, Kariya, Aichi-pref. (JP)

(72) Inventors: Takashi Takazawa, Kariya (JP); Makoto Sakai, Kariya (JP); Hiroshi Ando, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 14/900,560

(22) PCT Filed: Jul. 1, 2014

(86) PCT No.: PCT/JP2014/003494
§ 371 (c)(1),
(2) Date: Dec. 21, 2015

(87) PCT Pub. No.: WO2015/001796
PCT Pub. Date: Jan. 8, 2015

(65) Prior Publication Data
US 2016/0159280 A1 Jun. 9, 2016

(30) Foreign Application Priority Data
Jul. 2, 2013 (JP) .................................. 2013-138971

(51) Int. Cl.
*G02B 27/01* (2006.01)
*G09G 5/10* (2006.01)
(Continued)

(52) U.S. Cl.
CPC ................ *B60R 1/00* (2013.01); *B60K 35/00* (2013.01); *B60K 37/00* (2013.01); *B60R 11/02* (2013.01);
(Continued)

(58) Field of Classification Search
CPC ........ B60R 2300/205; B60R 2300/308; B60R 2300/70; B60R 2300/307;
(Continued)

(56) References Cited

U.S. PATENT DOCUMENTS

| 2002/0075136 A1* | 6/2002 | Nakaji ..................... G09G 3/20 340/425.5 |
| 2005/0154505 A1 | 7/2005 | Nakamura et al. |

(Continued)

FOREIGN PATENT DOCUMENTS

WO 2015/001796 A1 1/2015

OTHER PUBLICATIONS

ISR and Written Opinion Issued in PCT/JP2014/003494 dated Sep. 30, 2014.

*Primary Examiner* — Patrick N Edouard
*Assistant Examiner* — Douglas M Wilson
(74) *Attorney, Agent, or Firm* — Maschoff Brennan

(57) ABSTRACT

An image synthesizer apparatus for vehicle includes an image generator and an error detector. From multiple cameras arranged to a vehicle so that an imaging region of each camera partially overlaps with an imaging region of an adjacent camera, the image generator acquires images of areas allocated to the respective cameras, and synthesizes the acquired images to generate a synthetic image around the vehicle viewed from a viewpoint above the vehicle. The error detector detects errors in the cameras. When the error detector detects a faulty camera in the cameras, the image generator acquires, from the image captured by the camera adjacent to the faulty camera, an overlap portion overlapping with the image captured by the faulty camera, uses the overlap portion to generate the synthetic image, and applies image reinforcement to the overlap portion.

5 Claims, 12 Drawing Sheets

(51) Int. Cl.
| | |
|---|---|
| *G01C 21/36* | (2006.01) |
| *B60R 1/00* | (2006.01) |
| *B60R 11/02* | (2006.01) |
| *B60K 35/00* | (2006.01) |
| *G08G 1/16* | (2006.01) |
| *B60K 37/00* | (2006.01) |
| *G09G 5/373* | (2006.01) |
| *B60W 50/14* | (2020.01) |

(52) U.S. Cl.
CPC ......... *G02B 27/01* (2013.01); *G02B 27/0101* (2013.01); *G08G 1/165* (2013.01); *G08G 1/166* (2013.01); *G09G 5/10* (2013.01); *G09G 5/373* (2013.01); *B60K 2370/1529* (2019.05); *B60K 2370/177* (2019.05); *B60K 2370/179* (2019.05); *B60K 2370/191* (2019.05); *B60R 2300/205* (2013.01); *B60R 2300/308* (2013.01); *B60R 2300/8093* (2013.01); *B60W 2050/146* (2013.01); *G01C 21/3697* (2013.01); *G02B 2027/014* (2013.01); *G02B 2027/0138* (2013.01); *G09G 2320/0686* (2013.01); *G09G 2380/10* (2013.01)

(58) Field of Classification Search
CPC ...... B60R 2300/8093; B60R 2300/301; B60R 2300/302; G02B 27/01; G02B 2027/0118; G02B 2027/0138; G02B 2027/014; G02B 27/101; G01C 21/365; G01C 21/3697; G09G 5/373; G09G 2320/0686; G09G 2330/0686; G09G 2380/10; G08G 1/166; G06K 9/00671; G06K 9/00798; G06K 9/00805; G06K 9/00818; B60K 2350/1084; B60K 2350/1096; B60K 2370/179; B60K 2370/188; B60K 2370/191; B60K 2370/177; B60K 2370/1529; B60W 50/14; B60W 2754/10
See application file for complete search history.

(56) References Cited

U.S. PATENT DOCUMENTS

| | | | |
|---|---|---|---|
| 2005/0278113 | A1 | 12/2005 | Maruyama et al. |
| 2009/0135092 | A1* | 5/2009 | Uematsu ............ G02B 27/0101 345/7 |
| 2010/0066925 | A1* | 3/2010 | Nagahara ............ G02B 27/0101 349/11 |
| 2013/0027559 | A1 | 1/2013 | Edwards et al. |
| 2013/0235200 | A1* | 9/2013 | Giesler .................... B60R 1/00 348/148 |
| 2013/0249684 | A1* | 9/2013 | Hatakeyama .......... B60K 37/02 340/435 |

* cited by examiner

HEAD-UP DISPLAY AND PROGRAM

CROSS REFERENCE TO RELATED APPLICATION

This application is based on Japanese Patent Application No. 2013-138971 filed on Jul. 2, 2013, the disclosure of which is incorporated herein by reference.

TECHNICAL FIELD

The present disclosure relates to a head-up display and a program for displaying information with a front windshield of an automobile.

BACKGROUND ART

There is a proposed driving assistance apparatus for automobile (see Patent Literature 1 for example) in which a display unit with a horizontally-long display screen is installed below the front windshield and a display-targeting object ahead of the automobile (specifically, in its direction) is displayed on the display screen.

This proposed apparatus, based on a positional relationship between the automobile and the display-targeting object, estimates an actual direction to the display-targeting object relative to an eye point position of the driver and sets a display position of the display-targeting object to a position in the display screen intersecting with this direction.

When this technology is applied to a head-up display (also referred to as HUD hereinafter), a predetermined guide image (a graphic or the like representing a display-targeting object) can be overlaid at a position of the display-targeting object in the driver's field of view.

Concerning a head-up display, the inventors of the present application have found out the following.

In the above proposed technology, the display is enlarged as the display-targeting object approaches the automobile. When the display-targeting object goes out of a display region in a left direction or a right direction, an icon is displayed at a left edge or a right edge of the display screen.

Accordingly, when the above proposed technology is applied to a head-up display to enable the overlay display on the display-targeting object, it may provide a troublesome feeling to the driver.

Specifically, when the guide image, which is overlay-displayed on the display-targeting object, is enlarged in accordance with approach to the display-targeting object, it decreases a forward visibility of the automobile and causes troublesome.

Moreover, when a position of the display-targeting object goes out of the display region of the front windshield in the driver's field of view, the guide image suddenly disappears and an icon is displayed at a left edge or a right edge of the display screen. This is a troublesome display for the driver.

In particular, when the display-targeting object (e.g., a traffic signal) moves from an upper part of the front windshield to a rear side, the display of the icon representing its direction at a left edge or a right edge of the display screen provides an awkward feeling to the driver.

PRIOR ART LITERATURES

Patent Literature

Patent Literature 1: JP 2006-23277A

SUMMARY OF INVENTION

It is an object of the present disclosure to enable a head-up display, which displays a predetermined guide image by overlaying it on a display-targeting object in a field of view from an cabin of a vehicle, to change the guide image display without providing a troublesome feeling to a driver when the display-targeting object goes out of a display region.

In an example of the present disclosure, a head-up display comprises: a display unit that displays an image to a display region configured in a front windshield of an automobile; an automobile information acquirer; a forward environment information acquirer; a display-targeting object detector; and a display controller.

The automobile information acquirer acquires automobile information representing a traveling state of the automobile. The forward environment information acquirer acquires forward environment information representing an environment forward of the automobile in a traveling direction. The display-targeting object detector, based on the automobile information and the forward environment information, detects a display-targeting object on which guide information is to be displayed to the display region of the front windshield.

The display controller generates a guide image for overly-display of the guide information to the front windshield and performs overlay-display of the guide image to the front windshield with the display unit so that when the display-targeting object detected by the display-targeting object detector is viewed from an inside of a cabin of the automobile, the guide information and the display-targeting object overlap each other.

When a position of the display-targeting object changes and goes out of a predetermined display-setting area, the display controller darkens the guide image or changes over the guide image from a normal image to a simplified image which is smaller than the normal image.

According to the head-up display in the disclosure, when a position of the display-targeting object, which is a position viewed from the inside of the automobile cabin, goes out of a predetermined display-setting area, the guide image overlay-displayed on the display-targeting object does not suddenly disappears. It is possible to prevent this display change from providing a troublesome feeling to a driver.

Additionally, although the guide image is darkened or changed over to a smaller simplified image than the normal image when the position of the display-targeting object changes and goes out of the predetermined display-setting area, Its display position still corresponds to the position of the display-targeting object and thus it is possible to prevent this display change of the display-targeting object from providing a troublesome feeling to a driver.

Therefore, the head-up display in the disclosure is excellent in usability for an occupant such as a driver and the like.

The automobile information acquirer, the forward environment information acquirer, the display-targeting object detector and the display controller in the head-up display may be implemented by a program executed by a computer.

In this configuration, the computer can function as the above units in the disclosure when the program is stored in, for example, a computer-readable storage medium such as DVD-ROM, CD-ROM and hard disk and loaded to the computer on an as-needed basis or when the computer acquires the program via a communication line.

EMBODIMENTS FOR CARRYING OUT INVENTION

Embodiments will be described with the drawings.

Figure 1:
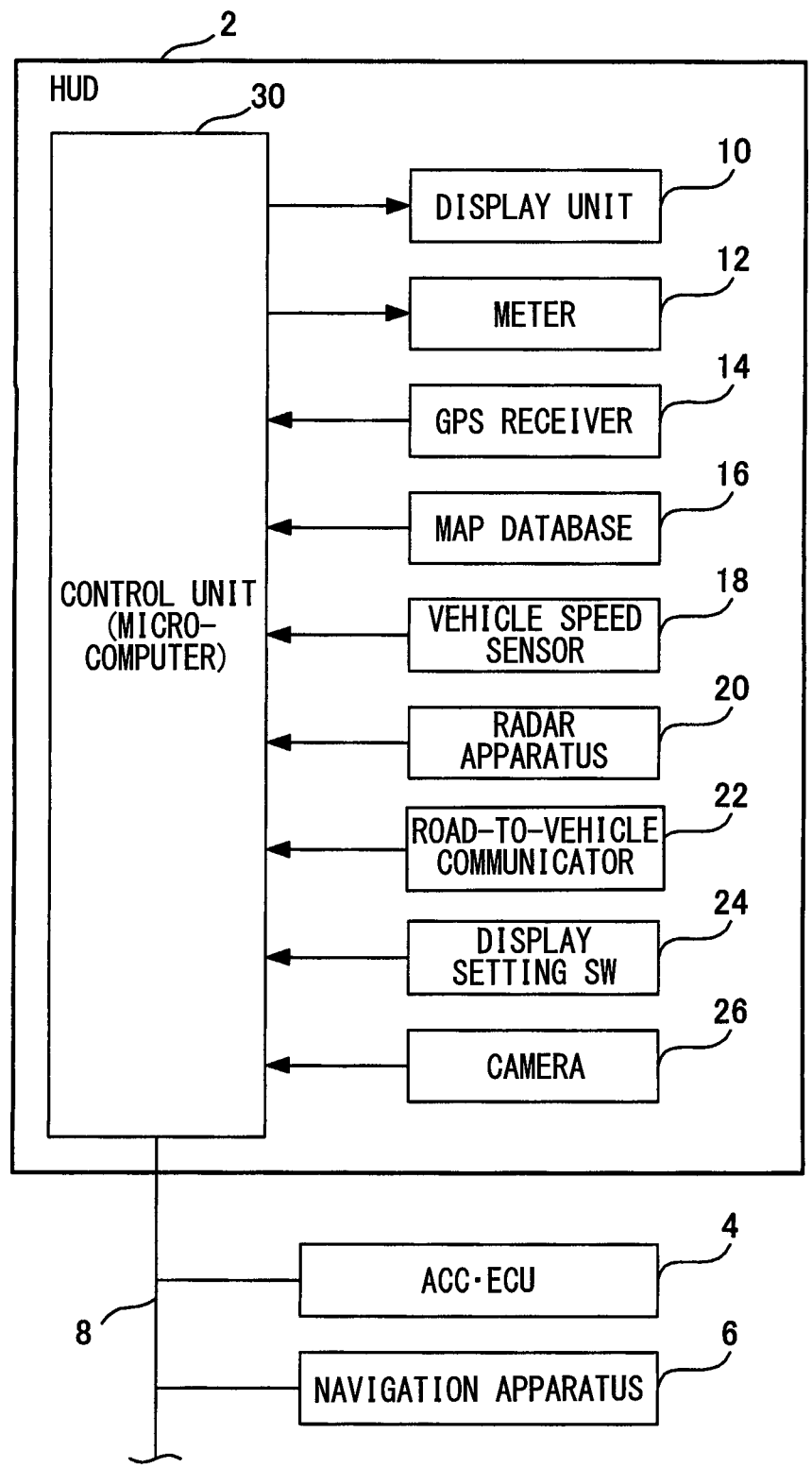
FIG. 1 is a block diagram illustrating an outline configuration of a head-up display of an embodiment.

As shown in FIG. 1, a head-up display (HUD) 2 of the present embodiment includes a display unit 10 and a control unit 30. The display unit 10 emits a display light for image display to a front windshield of an automobile, thereby visually displaying a virtual image so that the virtual image is overlaid in the actual field of view ahead of the automobile. The control unit 30 controls the display unit 10.

The control unit 30 includes a microcomputer with a CPU, a ROM, a RAM and the like, and generates various guide images and displays the guide images (virtual images) with the front windshield via the display unit 10.

The control unit 30 is connected with a meter 12, a GPS receiver 14, a map database 16, a vehicle speed sensor 18, a radar apparatus 20, a road-vehicle communication 22, a display setting switch (SW) 24, a camera 26 and the like in order to acquire a variety of information needed to generate the guide images.

The control unit 30 is further connected with in-vehicle apparatuses such as an ACC ECU 4 and a navigation apparatus 6 via a communication line 8 which constitutes an in-vehicle LAN. By communicating with these in-vehicle apparatuses, the control unit 30 can acquire information from other in-vehicle apparatuses.

The meter 12 includes, for example, a color display with a display screen such as a liquid crystal display and a needle type indicator. The meter 12 is provided in an instrumental panel in front of a driver seat and displays various vehicle states. The control unit 30 displays an operating state of the HUD 2 on the meter 12, and acquires the vehicle state from the meter 12 on an as-needed basis.

The GPS receiver 14 receives electromagnetic wave transmitted from GPS satellites and detects vehicle position, vehicle speed, acceleration etc. The control unit 30 acquires these kinds of information from the GPS receiver 14.

The GPS receiver 14 may receive electromagnetic wave transmitted from GPS satellites operated by the United States of America and may detect vehicle position, vehicle speed, acceleration etc. In addition to receiving the electromagnetic wave transmitted from the GPS satellites, the GPS receiver 14 may receive the electromagnetic wave transmitted from other satellites for satellite positioning systems (GLONASS, Galileo, Quasi-zenith satellites) and detect vehicle position, vehicle speed, acceleration etc. Alternatively, instead of the GPS receiver 14, a device for receiving the electromagnetic wave transmitted from satellites for satellite positioning systems other than GPS and detecting vehicle position, vehicle speed, acceleration etc. may be used.

The map database 16 stores map data (node data, link data, cost data, road data, topographical data, mark data, intersection data, stop point data, facility data etc.) and is used to provide the stored map data to the control unit 30.

The vehicle speed sensor 18 is attached to a tire wheel or a propeller shaft and generates a pulse signal according to its rotation and is used to detect travel speed of the vehicle (automobile speed) based on time intervals of the pulse signals.

The radar apparatus 20 transmits a radar wave toward the front of the vehicle and is used to detect a distance to a vehicle ahead (preceding vehicle) and a relative speed.

The road-vehicle communicator 22 performs wireless communication with on-road equipment located near a travel route of the vehicle and is used to acquire road traffic information (road congestion information, traffic regulation information etc.) from the on-road equipment.

The display setting SW 24 is used to set a display mode of the HUD 2 such as a guide image type displayed to the automobile front windshield via the display unit 10 and includes a switch manipulated by a user.

The camera 26 captures an image in a vehicle traveling direction (forward environment image). The captured image is used for the control unit 30 to detect a display-targeting object, which is an object for which the guide image is displayed.

The ACC ECU 4 is an electronic control unit for performing ACC (auto-cruise control). The navigation apparatus 6 displays a road map on a display in front of the driver's seat and performs travel route guidance.

Conventional elements may be used for the above elements. Next, a display control process performed by the control unit 30 will be described.

The microcomputer of the control unit 30 executes a program stored in a storage medium such as the ROM to implement the display control process.

Figure 2:
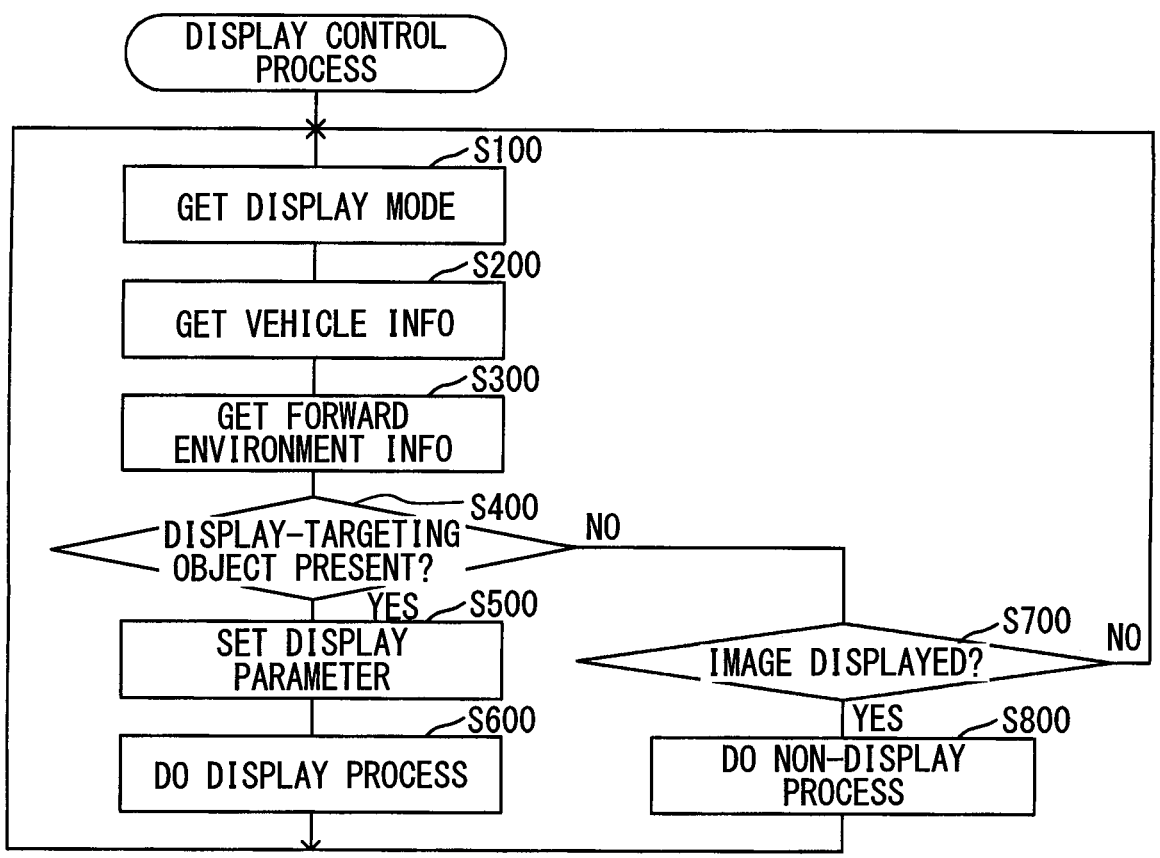
FIG. 2 is a flowchart illustrating a display control process performed by a control unit.

As shown in FIG. 2, when starting the display control process, the control unit 30 first performs S100 (S denotes step) to acquire start-up-related information of the in-vehicle apparatuses connected via the communication line 8 and acquire the operating mode of the HUD 2 set via the display setting SW 24.

For example, at S100, the control unit 30 acquires ON/OFF of the route guidance of the navigation apparatus 6, ON/OFF of the ACC ECU4, ON/OFF of warning about speed limit/road traffic signal etc. As a result, the control unit 30 can identify a type of display-targeting object for which the guide image is to be overlay-displayed through the front windshield.

Subsequently, at S200, the control unit 30 performs a vehicle information acquisition process to acquire a driving state of the vehicle and a surrounding condition. At S300, the control unit 30 performs a forward environment information acquisition process to acquire forward environment information such as a road condition ahead of the vehicle and a preceding vehicle.

At S400, based on the information acquired at S100 to S300, the control unit 30 determines whether or not the display-targeting object, for which the guide image should be overlay-displayed through the front windshield, is present. The display-targeting object may be a road traffic signal, a road sign, an advertisement, a preceding vehicle, a pedestrian or the like.

When the control unit 30 determines at S400 the display-targeting object is present, the control unit 30 proceeds to S500 and sets at display parameter corresponding to the display-targeting object such as a type of guide image, a display position, and a display manner.

At S600, based on the display parameter set in the display parameter setting process at S500, the control unit 30 performs a display process and then proceeds to S100. In the display process, the guide image 4 for display is generated and outputted to the display unit 10 so that, when viewed from the eye point of the driver, the guide image (specifically, a graphic corresponding to the display-targeting object) is displayed at the position that matches the position of the display-targeting object in the windshield.

When determining at S400 that there is no display-targeting object, the control unit 30 proceeds to S700 and determines whether or not the guide image is presently displayed. When the guide image is presently displayed, the control unit 30 proceeds to S800 to perform a non-display process to implement non-display of the guide image and proceeds to S100. When the guide image is not presently displayed, the control unit 30 proceeds to S100.

In the non-display process at S800, the luminance of the guide image is gradually decreased with a given damping time constant and the display is gradually cleared, so that the guide image does not instantaneously disappear (in order words, a sudden luminance change is avoided).

Figure 3:
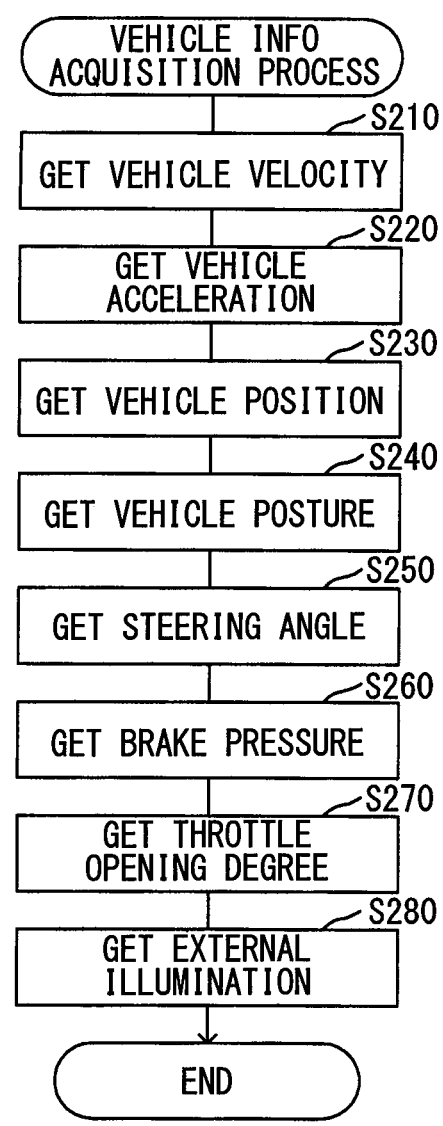
FIG. 3 is a flowchart illustrating a vehicle information acquisition process in FIG. 2.

The vehicle information acquisition process at S200 is performed, for example, in a manner illustrated in FIG. 3.

Specifically, in the vehicle information acquisition process, the control unit 30 acquires vehicle speed using the vehicle speed sensor 18, the GPS receiver 14 or the like at S210. The vehicle speed may be acquired by integration of the acceleration detected by an acceleration sensor (not shown). The vehicle speed may be acquired from the GPS receiver 14. Alternatively, the vehicle speed may be acquired via the communication line 8 from another in-vehicle apparatus having a vehicle speed detection function.

Subsequently, at S220, the control unit 30 acquires acceleration of the vehicle (vehicle acceleration) from an acceleration sensor (not shown), the GPS receiver 14, or another in-vehicle apparatus connected via the communication line 8.

At S230, the control unit 30 acquires a coordinate point of the vehicle (vehicle position) from the GPS receiver 14, an inertial navigation apparatus (not shown), a matching of these detection results with the map database 16, a navigation apparatus 6 connected via the communication line 8, or the like.

Subsequently, at S240, the control unit 30 acquires information on a vehicle posture (angular velocities about X, Y, X axes, angular accelerations, directions of respective axes) from a gyro sensor (not shown), a geomagnetic sensor (not shown), or another in-vehicle apparatus connected via the communication line 8.

At S250, the control unit 30 acquires a steering angle of the vehicle from a steering angle sensor (not shown) attached to a steering column or a steering linkage or from another in-vehicle apparatus connected via the communication line 8.

Subsequently, at S260, the control unit 30 acquires braking pressure (in other words, brake force) from a pressure sensor (not shown) provided to a brake-related oil pressure system or from another in-vehicle apparatus (ABS ECU etc.) connected via the communication line 8.

At S270, the control unit 30 acquires an opening degree of a throttle valve (throttle opening degree) from a throttle position sensor (not shown) provided to an engine of the vehicle or from another in-vehicle apparatus (engine ECU etc.) connected via the communication line 8.

At S280, the control unit 30 acquires illuminance outside the vehicle (external illumination) from a luminance sensor (not shown) or from another in-vehicle apparatus (e.g., air conditioner ECU etc.) connected via the communication line 8.

As described above, the vehicle information acquisition process acquires the vehicle information such as the vehicle seed, the vehicle acceleration, the vehicle position, the vehicle posture, the steering angle, the braking pressure, the throttle opening degree, external illumination etc. In the vehicle information acquisition process, an order of S210 to S280 may be changed and some of S210 to S280 may be omitted.

Figure 4:
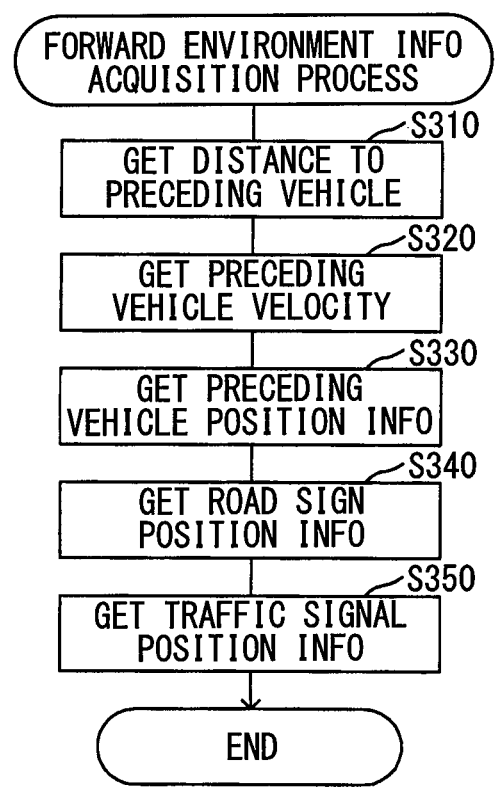
FIG. 4 is a flowchart illustrating a forward environment information acquisition process shown in FIG. 2.

The forward environment information acquisition process at S300 is performed in a manner illustrated in, for example, FIG. 4.

Specifically, in the forward environment information acquisition process, the control unit 30 first acquires a vehicle-to-vehicle distance between the vehicle and the preceding vehicle from the radar apparatus 20 at S310. Subsequently, at S320, the control unit 30 acquires speed of the preceding vehicle from the radar apparatus 20. At S330, the control unit 30 acquires positional information of the preceding vehicle relative to the vehicle (azimuth, and elevation and depression) from the radar apparatus 20.

These kinds of information may be acquired via the communication line 8 from another in-vehicle apparatus having the same function as the radar apparatus.

Subsequently, at S340, the control unit 30 acquires positional information (azimuth, elevation/depression angle, distance) of a traffic sign ahead of the vehicle based on image processing on the image captured by the camera 26, the vehicle positional information acquired at S230, the map data stored in the map database 16, and the like.

Subsequently, at S350, the control unit 30 acquires positional information (azimuth, elevation/depression angle, distance) of a road traffic signal ahead of the vehicle based on image processing on the image captured by the camera 26, the vehicle positional information acquired at S230, the map data stored in the map database 16, and the like.

At S340 and S350, the control unit 30 may use the navigation device 6 connected via the communication line 8 to acquire the positional information of a traffic sign and a road traffic signal.

In the above way, the forward environment information acquisition process acquires the vehicle-to-vehicle distance to the preceding vehicle, the speed of the preceding vehicle, the positional information of the preceding vehicle, the positional information of the road sign, and the positional information of the road traffic signal.

In the forward environment information acquisition process, an order of S310 to S350 may be changed. Some of S310 to S350 may be omitted.

Figure 5:
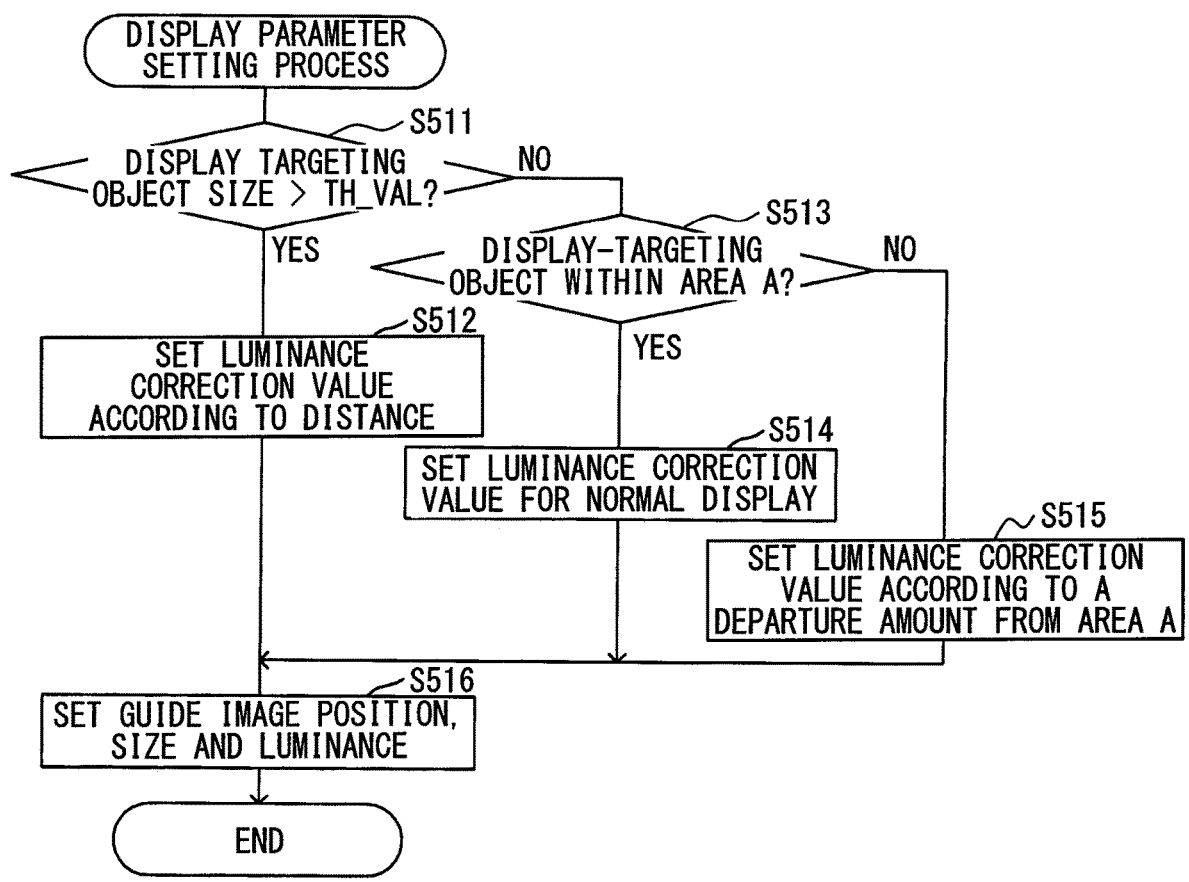
FIG. 5 is a display parameter setting process shown in FIG. 2.

The display parameter setting process at S500 is performed in a manner illustrated in FIG. 5.

In the display parameter setting process, the control unit 30 first determines whether or not a size of the display-targeting object is larger than a predetermined threshold TH_VAL[m].

When the display-targeting object is larger than the threshold TH_VAL[m], the control unit 30 proceeds to S512 and sets a luminance correction value for correcting the luminance of the guide image overlay-displayed on the display-targeting object.

Figure 6:
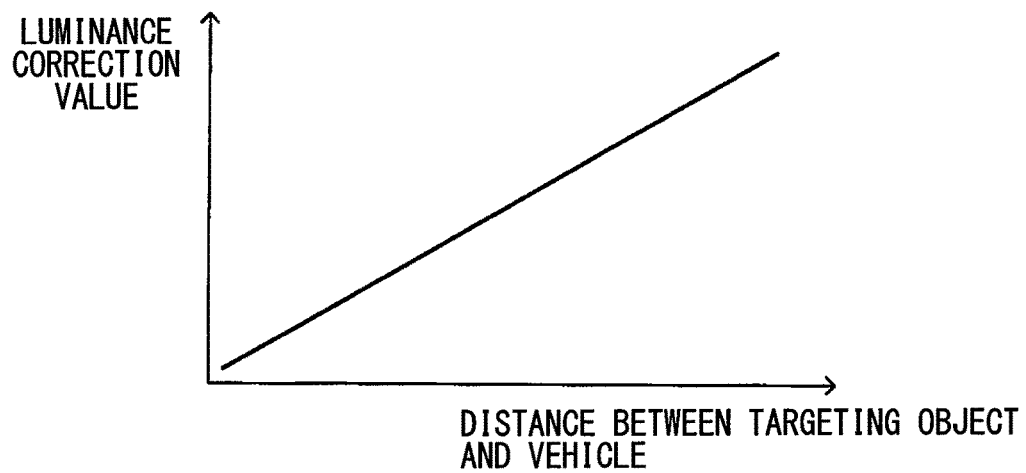
FIG. 6 is a diagram illustrating a map for setting a luminance correction value according to distance.

The correction of the luminance is made by multiplying a reference luminance by the luminance correction value. The luminance correction value is set using a map having characteristics shown in FIG. 6.

When the display-targeting object is larger than the threshold TH_VAL[m], the luminance of the guide image is set according to the distance between the vehicle and the display-targeting object, so that the larger the distance, the smaller the luminance, and vice versa.

Figure 7:
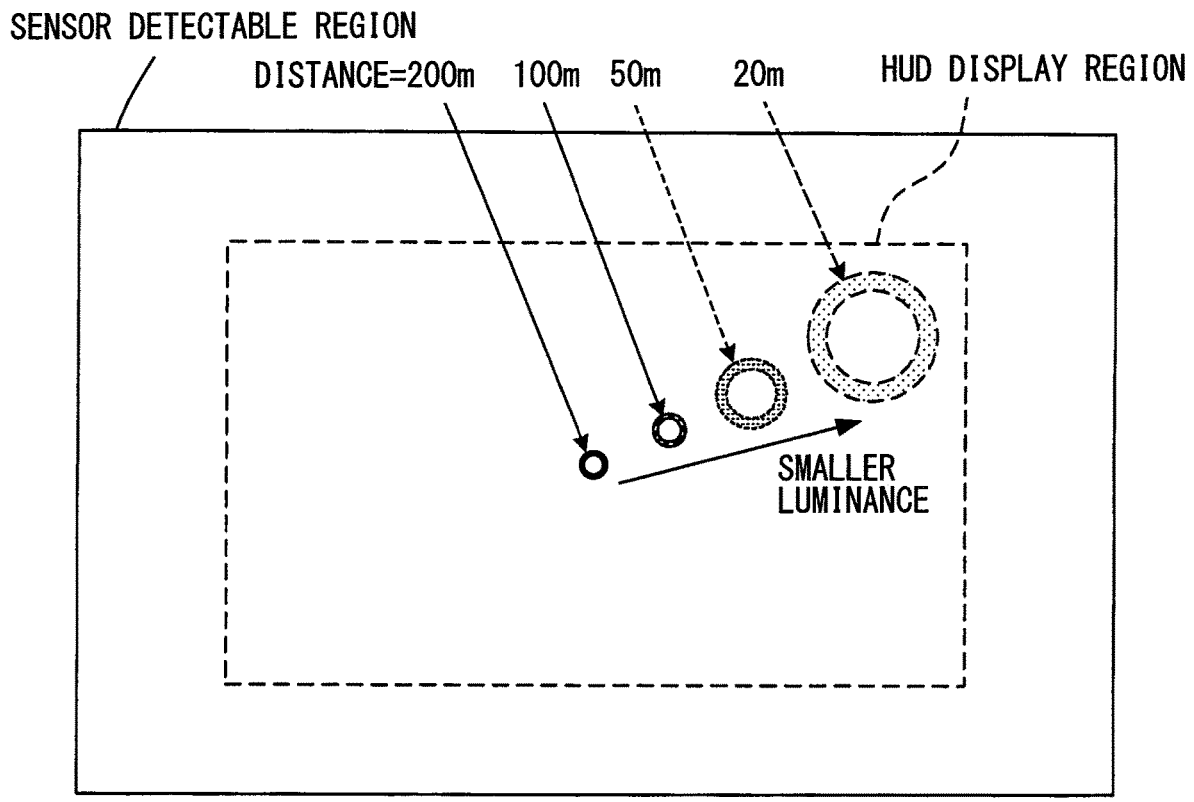
FIG. 7 is a diagram illustrating a luminance change of guide image when a display-targeting object is large.

As shown in FIG. 7, when the display-targeting object is larger than the threshold TH_VAL[m], the luminance of the guide image overlay-displayed on the display-targeting object decreases with increasing distance between the subject vehicle and the display-targeting object and with increasing apparent size of the display-targeting object viewed through the front windshield. In other words, the guide image is darker as the distance between the subject vehicle and the display-targeting object is smaller and as the apparent size of the display-targeting object viewed through the front windshield is larger.

In the FIG. 7, the HUD display region refers to a display region in which the display unit can display the guide image (figures in FIG.) to the front windshield. The sensor detectable region refers to a region in which the forward environment informant acquisition process can detect the preceding vehicle, the traffic sign, the road traffic signal and the like.

Figure 8:
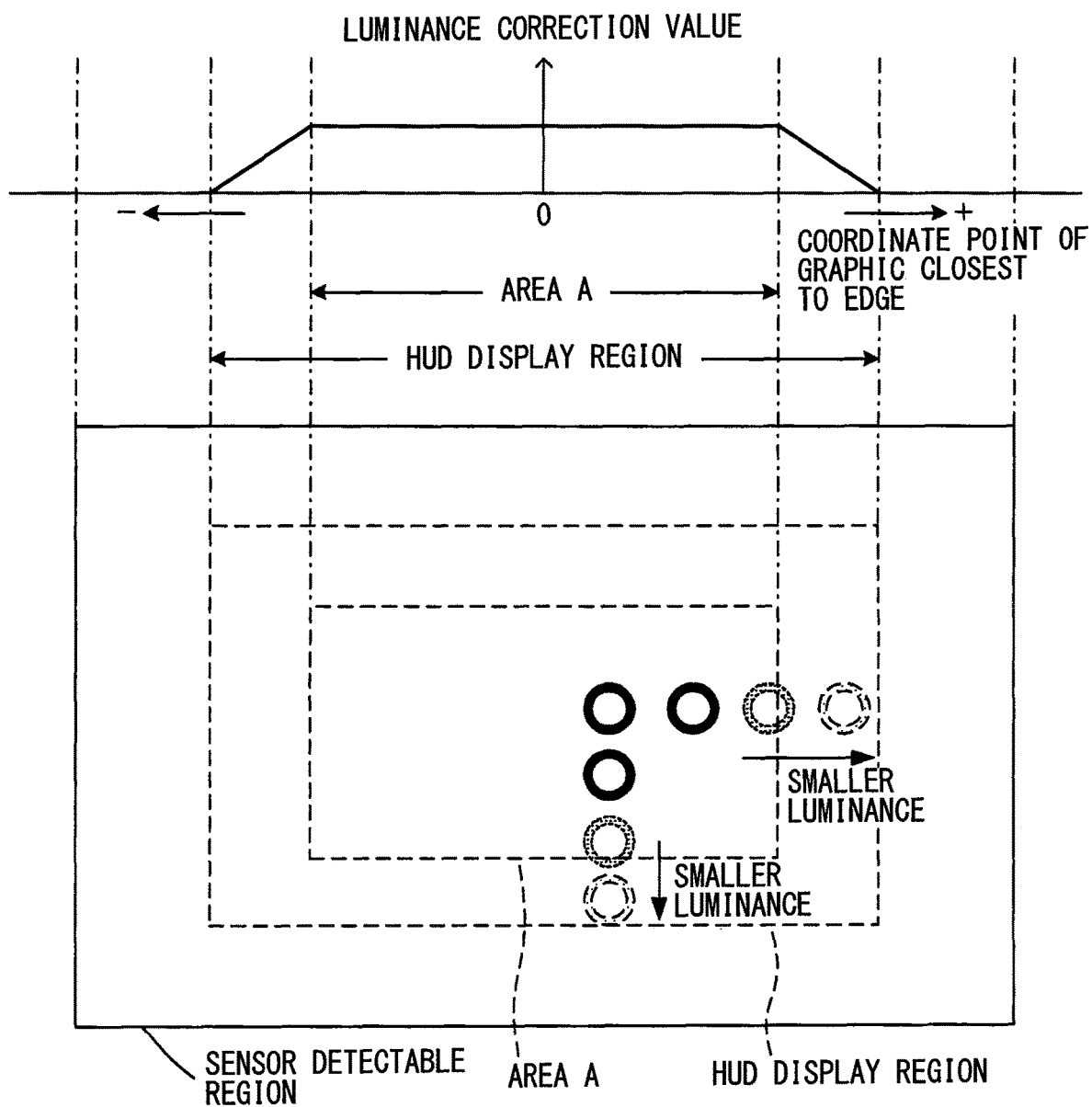
FIG. 8 is a diagram illustrating a map for setting a luminance correction value according to display position.

When determining at S511 that the display-targeting object is smaller than or equal to the threshold TH_VAL[m], the control unit 30 proceeds to S513 and determines whether or not, when viewed from the eye point of the driver, the display-targeting object (specifically, the guide image overlay-displayed on the display-related object) is within in the area A illustrated in FIG. 8.

The area A refers to a display-setting area, which is designated so as to be smaller than the HUD display region.

When the display-targeting object is within the area A, the control unit 30 proceeds to S514 in which the luminance correction value for normal display is set as the luminance correction value of the guide image overlay-displayed on the display-targeting object.

When the display-targeting object is out of the area A, the control unit 30 proceeds to S514 in which the luminance correction value is set according to an amount of the departure of the guide image from the area A.

As shown in FIG. 8, a map for setting the luminance correction value is defined such that the luminance correction value decreases with increasing amount of departure from the area A and that the luminance correction value has "0" at an edge of the HUD display region.

Figure 9:
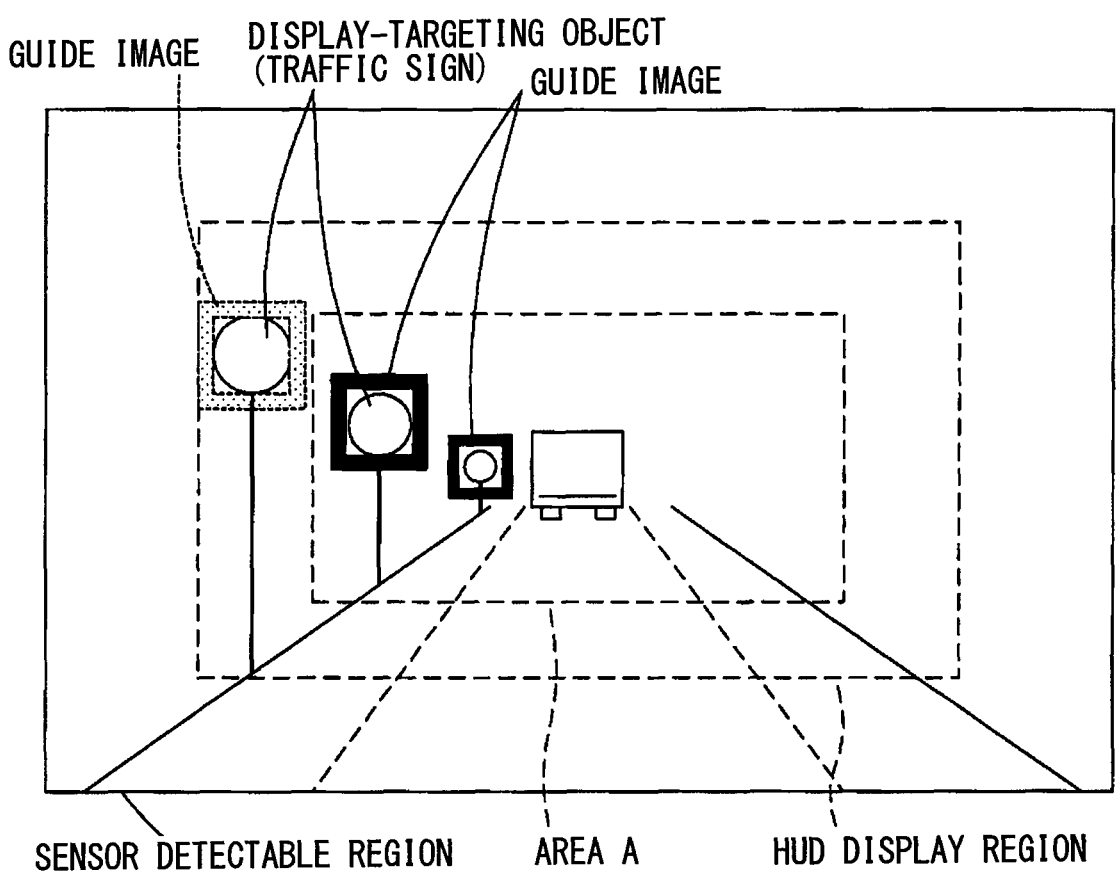
FIG. 9 is a diagram illustrating a luminance change of a guide image according to display position.

As a result, as shown in FIG. 9, when the size of the display-targeting object (traffic sign in the drawing) is not larger than the threshold TH_VAL[m], the luminance of the guide image overlay-displayed on the display-targeting object is set to a normal luminance for normal display if the position of the display-targeting object viewed from the driver is within the area A and the luminance of the guide image is corrected to be a smaller value if the display-targeting object moves out of the area A.

Accordingly, the guide image gets darker as the position of the display-targeting object viewed from the driver moves to an outside of the area A. At the end of the HUD display region, its luminance reaches "0" and the guide image disappears.

After setting the luminance correction value at S512, S514, S515, the control unit 30 proceeds to S516 and sets the display position, size and display luminance of the guide image overlay-displayed on the display-targeting object and ends the display parameter setting process.

At S516, based on the direction and distance to the display-targeting object and the posture direction, speed, acceleration and like of the vehicle, the control unit 30 sets the display position and size of the display-targeting object so that the displayed guide image matches the forward environment movement. The display luminance of the guide image is calculated by setting the reference luminance based on the external illuminance acquired at S280 and by multiplying the reference luminance by the luminance correction value set at S512, S514, and S515.

In the above-illustrated embodiment, the guide image is overlay-displayed on the display-targeting object. In doing so, when the display-targeting object is larger than the threshold, the display luminance of the guide image decreases with decreasing distance between the subject vehicle and the display-targeting object (in other words, with increasing display area of the guide image), whereby the guide image darkens.

When the display-targeting object is smaller than or equal to the threshold and is out of the area A of the display region, the display luminance of the guide image decreases according to its departure amount, whereby the guide image darkens.

Therefore, when the display-targeting object is out of the display region of the HUD 2 on the front windshield, the HUD 2 of the present embodiment can prevent the guide image from suddenly disappearing and prevent this display change from providing a troublesome feeling to the driver.

When the display-targeting object is smaller than or equal to the threshold and the position of the display-targeting object is moves in an outside of the area A, the guide image is gradually darken. This prevents the luminance change of the guide image from providing a troublesome feeling to the driver.

Although one embodiment of the present disclosure has been illustrated, embodiments of the present disclosure are not limited to the above-illustrated embodiment and can have various forms.

In the above embodiment, the luminance of the guide image overlay-displayed on the display-targeting object is changed according to the size or position of the display-targeting object viewed from the driver, so that the troublesome feeling of the driver provided by the display of the guide image is reduced.

In another configuration, the shape of the guide image overlay-displayed on the display-targeting object may be changed. This can also reduce the troublesome feeling of the driver provided by the display of the guide image A display parameter setting process for this configuration will be described as a first modification and a second modification.

(First Modification)

Figure 10:
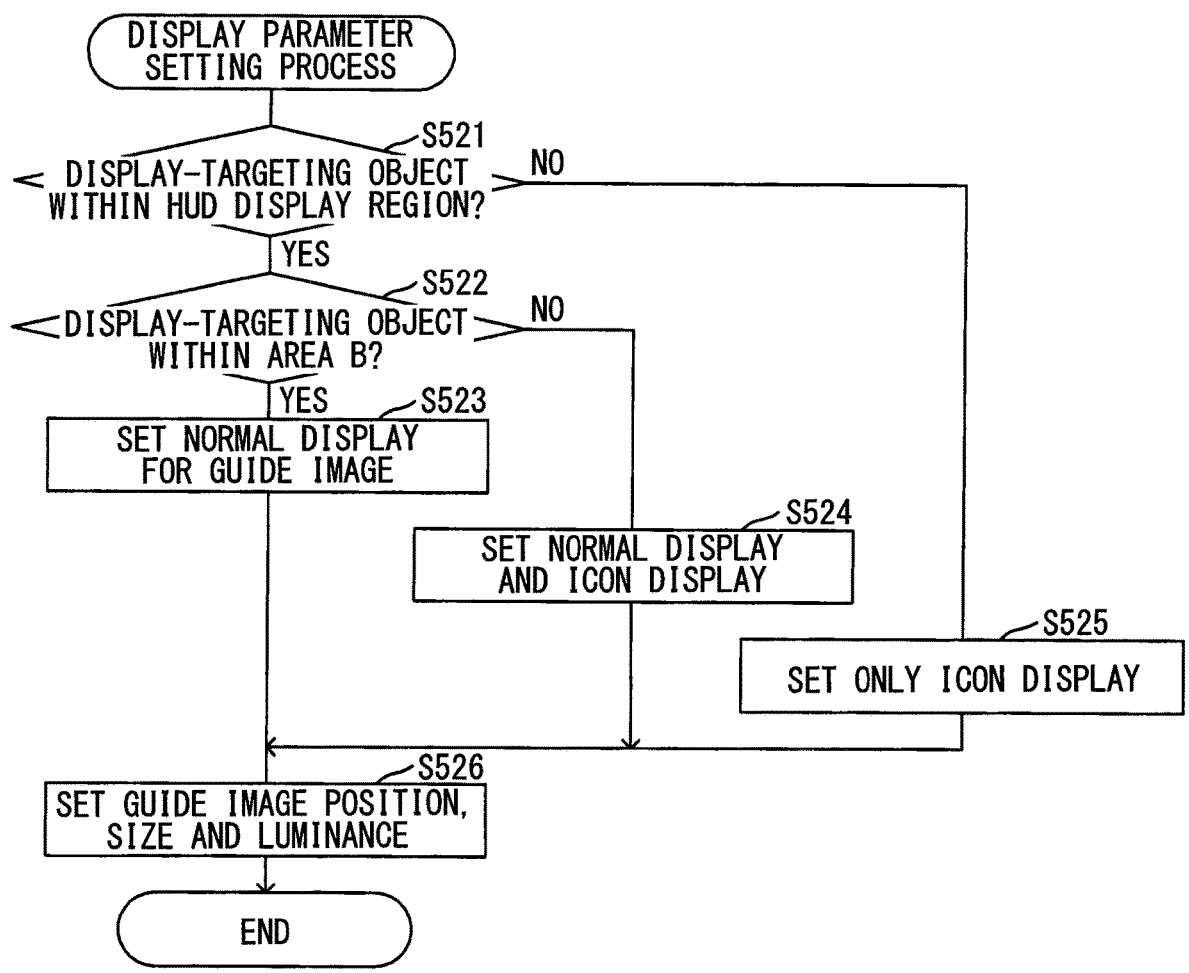
FIG. 10 is a flowchart illustrating a first modification of a display parameter setting process.

As shown in FIG. 10, in the display parameter setting process according to the first modification, the control unit 30 first determines at S521 whether or not, when viewed from the driver, the position of the display-targeting object is within the HUD display region.

When determining at S521 that the position of the display-targeting object is within the HUD display region, the control unit 30 proceeds to S520 and determines whether or not, when viewed from the driver, the position of the display-targeting object is within an area B.

Figure 11:
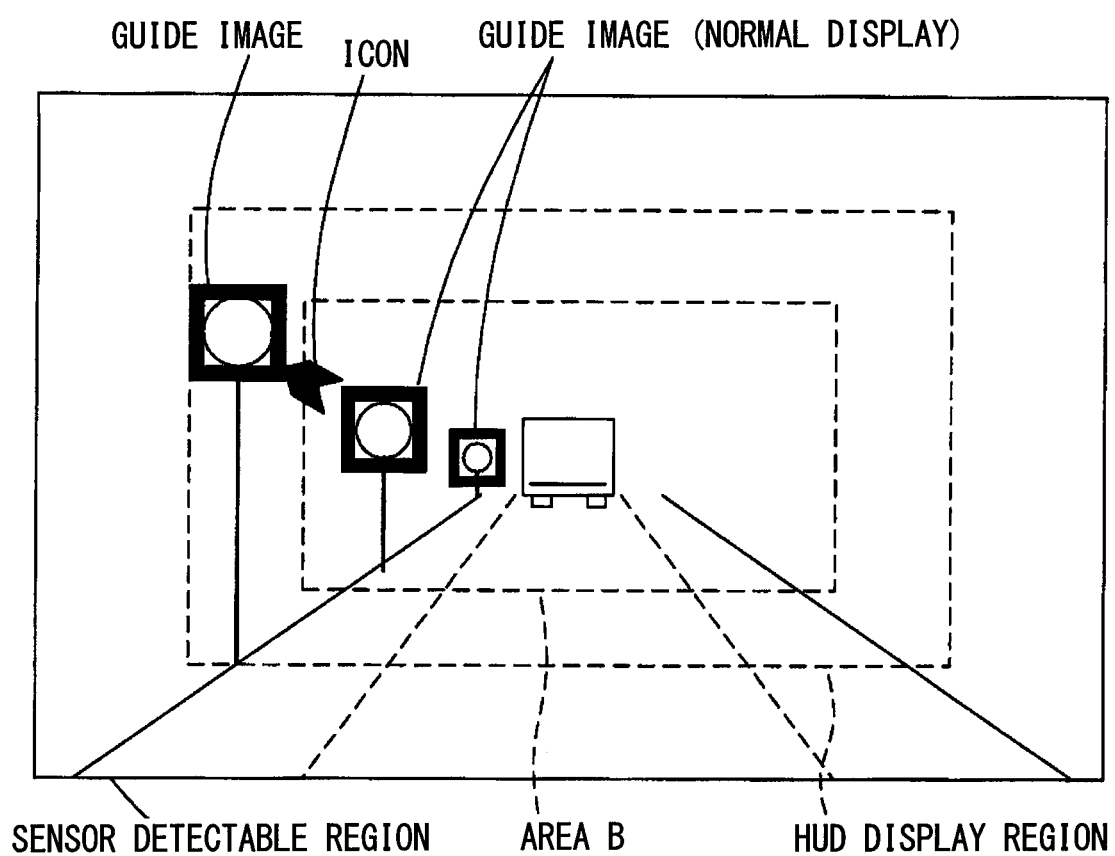
FIG. 11 is a diagram illustrating a guide image change according to a display parameter setting process of FIG. 10.
Figure 12:
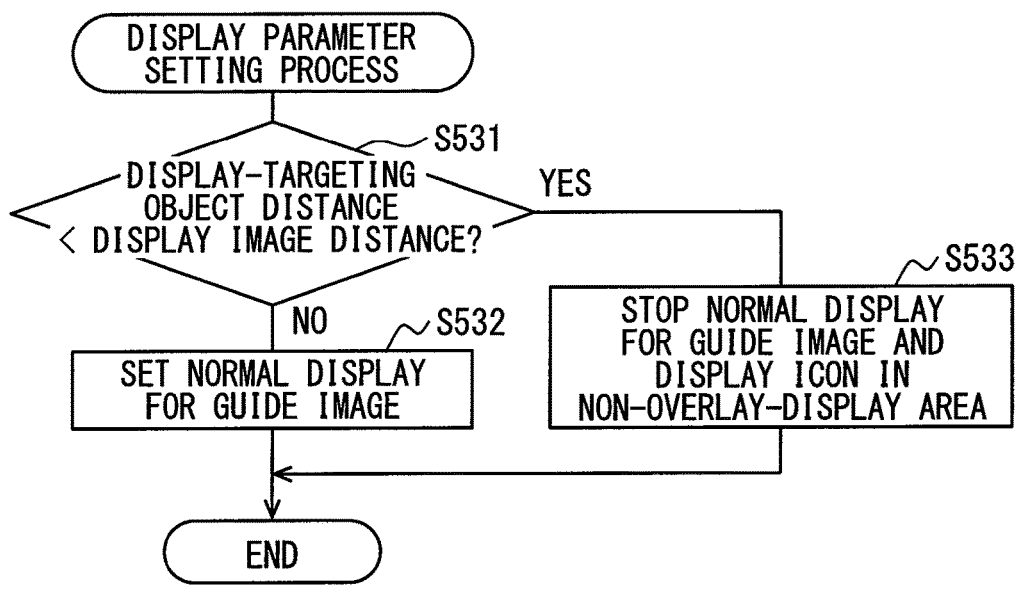
FIG. 12 is a flowchart illustrating a second modification of a display parameter setting process.

As shown in FIG. 11, the area B is a pre-designated display-setting area, which is inside the HUD display region and is smaller than the HUD display region.

When determining at S522 that the position of the display-targeting object is within the area B, the control unit 30 sets a normal display to the display-targeting object (road sign in the drawing) to overlay a preset normal guide image (rectangular in the drawing), as shown in FIG. 11.

When determining at S522 that the position of the display-targeting object is not within the area B, the control unit 30 proceeds to S524 and performs a display setting to display the normal guide image and an icon which acts as a simplified image indicating a direction to the display-targeting object, as shown in FIG. 11.

When determining at S521 that the position of the display-targeting object is out of the HUD display region, the control unit 30 performs a display setting to display only the icon at the edge position from which the display-targeting object moves out of the HUD display region, so that the direction to the display-targeting object is perceivable.

When setting the normal display or performing the display setting to display the normal guide image and the icon or performing the display setting to display only the icon at S523, S524 or S525, the control unit 30 sets the display position, size and display luminance of the guide image in accordance with the set display content, and ends the display parameter setting process.

In the first modification, when the display-targeting object is within the area B when viewed from the driver seat, the normal guide image is overlay-displayed on the display-targeting object. When the display-targeting object is out of the area B but within the HUD display region, the icon is overlay-displayed for the display-targeting object in addition to the normal guide image. When the display-targeting object is out of the HUD display region, only the icon is displayed at the edge of the HUD display region.

Therefore, in the first modification, even when the display-targeting object viewed by the driver goes out of the display region of the HUD 2 on the front windshield, the guide image does not suddenly disappear. The troublesome feeling of the driver due to this display change is prevented.

Moreover, because the icon indicating the direction to the display-targeting object is displayed at the edge of the HUD display region when the display-targeting object moves to the outside of the HUD display region, the driver can recognize the direction to the display-targeting object.

(Second Modification)

Figure 13:
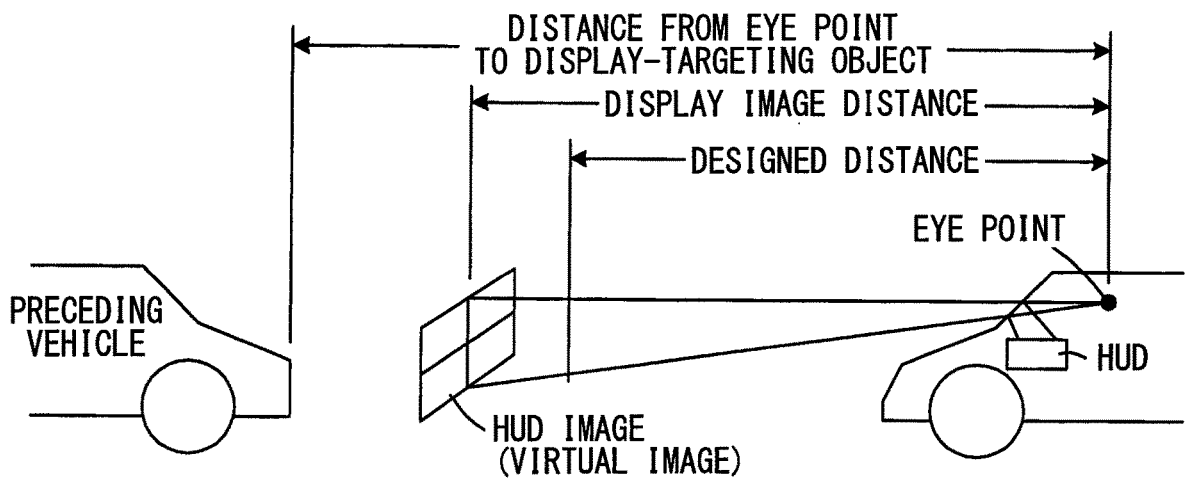
FIG. 13 is a diagram illustrating a changeover manner of a guide image according to a display parameter setting process of FIG. 12.

As shown in FIG. 11, in the display parameter setting process according to the second modification, the control unit 30 first determines at S531 whether or not a distance from the eye point of the driver to the display-targeting object (preceding vehicle in the drawing) is smaller than a designated distance (see FIG. 13). The designated distance is a distance that enables the guide image to be overlay-displayed on the display-targeting object via the display unit 10 (see FIG. 13).

In consideration of the display image distance (see FIG. 13) and human eye's power of accommodation, this setting distance is pre-designated to such a distance in which the HUD image does not appear to get stuck in such a display-targeting object as a preceding vehicle.

When the distance to the display-targeting object is greater than or equal to the designated distance, the control unit 30 proceeds to S532 and sets the display position, size and display luminance of the guide image for performing the normal display of the guide image, and then ends the display parameter setting process.

When the distance to the display-targeting object is smaller than the designated distance, the control unit 30 proceeds to S533 and stops the normal display of the guide image and displays the icon, which is the simplified image of the guide image, in a non-overlay-display area, and then ends the display parameter setting process. The non-overlay-display area is different from the display region which is for the overlay display of the guide image.

Specifically, when the guide image is overlay-displayed on the display target object under a situation where, the distance to the display-targeting object is smaller than the designated distance, the guide image gets stuck in the display-targeting object and provides a strange feeling to a driver.

Figure 14:
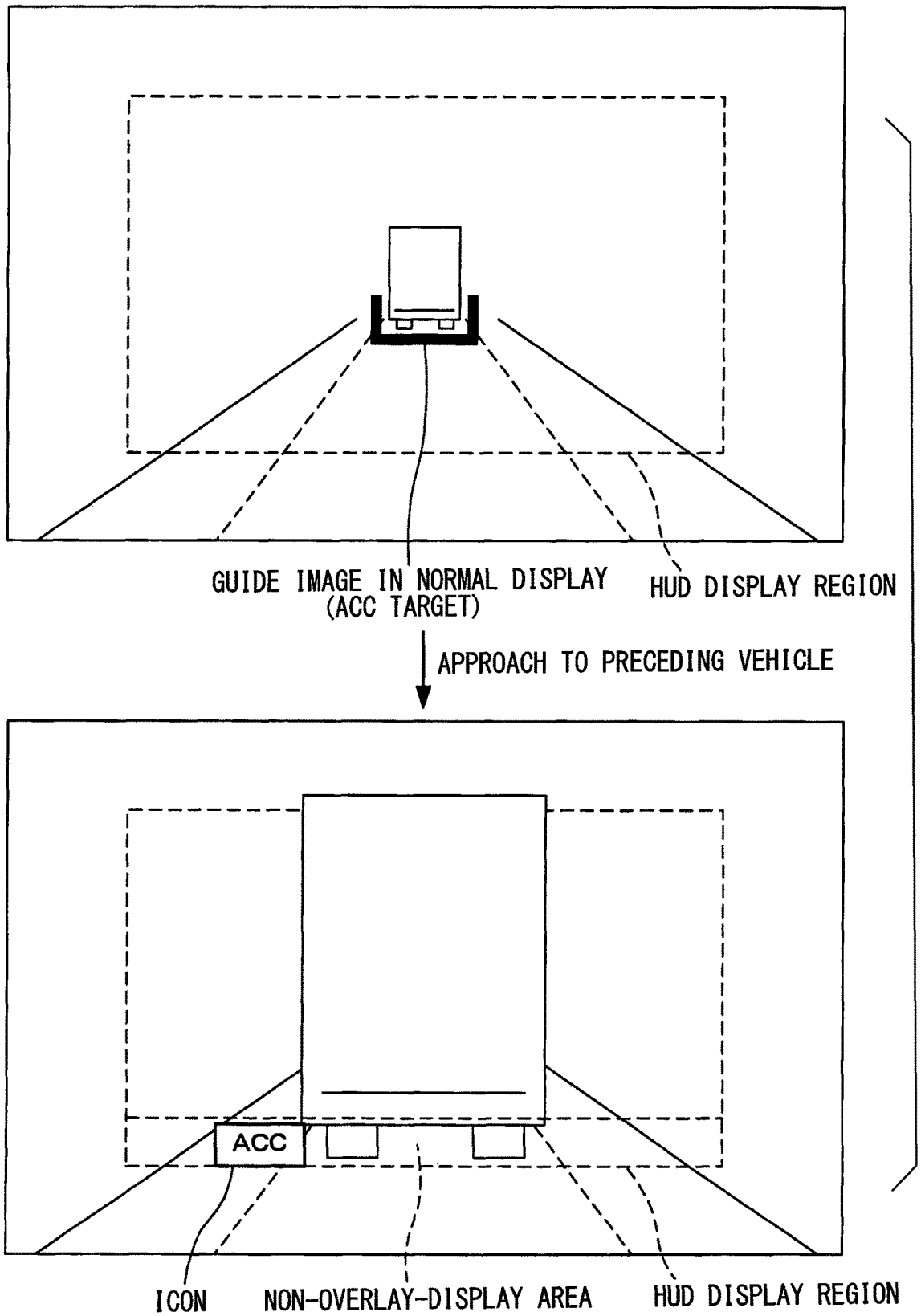
FIG. 14 is a diagram illustrating a guide image change according to a display parameter setting process of FIG. 12.

In view of this, the second modification is such that when the distance from the eye point of the driver to the display-target object becomes smaller than the designated distance illustrated in FIG. 13, it is determined that the position of the display-targeting object goes out of the display-setting area, and the guide image is changed over from the normal display illustrated in FIG. 14 to the icon display on the non-overlay-display area.

Therefore, in the second modification, even when the vehicle approaches the preceding vehicle serving as an ACC target and the distance to the preceding vehicle becomes smaller than the designated distance, the guide image is displayed so as not to get stuck in the proceeding vehicle and the driver is prevented from having a strange feeling.

In FIG. 14, the non-overlay-display area is provided below the HUD display region. An icon indicating the ACC control is in operation is displayed in the non-overlay-display area.

Because it is sufficient that this icon display notifies the driver that the ACC control is in operation, the non-overlay-display area may be provided in the meter 12 and the meter 12 may display the icon indicating that ACC control is in operation.

In the above embodiments and modifications, the control unit 30 performing the S200 acts as an embodiment of a vehicle information acquirer. The control unit 30 performing the S300 acts as an embodiment of a forward environment information acquirer. The control unit 30 performing the S400 acts as an embodiment of a display-targeting-object detector. The control unit 30 performing the S500 acts as an embodiment of a display controller.

The invention claimed is:

1. A head-up display comprising:
 a display unit that displays an image to a display region configured in a front windshield of an automobile;
 an automobile information acquirer that acquires automobile information representing a traveling state of the automobile;
 a forward environment information acquirer that acquires forward environment information representing an environment forward of the automobile in a traveling direction;
 a display-targeting object detector that, based on the automobile information and the forward environment information, detects a display-targeting object on which guide information is to be displayed to the display region of the front windshield; and a display controller that generates a guide image for overlay-display of the guide information to the front windshield and performs overlay-display of the guide image to the front windshield with the display unit so that at a time the display-targeting object detected by the display-targeting object detector is viewed from an inside of a cabin of the automobile, the guide information and the display-targeting object overlap each other, the display controller being configured to determine whether a size of the display-targeting object is larger than a predetermined threshold, wherein the display controller sets a display luminance of the guide image for a display-targeting object having a size that is greater than the predetermined threshold based on a distance between the automobile and the display-targeting object such that the display luminance of the guide image changes as the distance between the automobile and the display-targeting object increases, and the display controller sets a display luminance of the guide image for a display-targeting object having a size that is less than the predetermined threshold based on whether the display-targeting object is within a predetermined display-setting area that is smaller than the display region, the display controller changes the display luminance of the guide image for the display-targeting object that is smaller than the predetermined threshold in response to the display-targeting object moving outside of the predetermined display-setting area.

2. The head-up display according to claim 1, wherein:

in response to a position of the display-targeting object, which is a position viewed from the inside of the cabin of the automobile, moving out of the predetermined display-setting area, which is smaller than the display region, while staying inside the display region of the front windshield, the display controller darkens the guide image based on an amount of departure of the guide image from the predetermined display-setting area.

3. The head-up display according to claim 2, wherein in response to a position of the display-targeting object, which is the position viewed from the inside of the cabin of the automobile, moving from an inside of the display region, the display controller changes the display luminance of the guide image so that the guide image disappears at a time the position of the display-targeting object reaches an edge of the display region.

4. A non-transitory storage medium storing a program for causing a computer to function as the automobile information acquirer, the forward environment information acquirer, the display-targeting object detector and the display controller of the head-up display recited in claim 1.

5. The head-up display according to claim 1, wherein:

the predetermined display-setting area is enclosed within the display region.

* * * * *